(12) United States Patent
Gesmundo (10) Patent No.: US 11,544,536 B2
(45) Date of Patent: Jan. 3, 2023

(54) HYBRID NEURAL ARCHITECTURE SEARCH

(71) Applicant: Google LLC, Mountain View, CA (US)

(72) Inventor: Andrea Gesmundo, Zurich (CH)

(73) Assignee: Google LLC, Mountain View, CA (US)

( * ) Notice: Subject to any disclaimer, the term of this patent is extended or adjusted under 35 U.S.C. 154(b) by 742 days.

(21) Appl. No.: 16/586,832

(22) Filed: Sep. 27, 2019

(65) Prior Publication Data

US 2020/0104687 A1 Apr. 2, 2020

Related U.S. Application Data

(60) Provisional application No. 62/737,847, filed on Sep. 27, 2018.

(51) Int. Cl.
    *G06N 3/04* (2006.01)
    *G06F 17/18* (2006.01)
    *G06N 3/08* (2006.01)

(52) U.S. Cl.
    CPC ........... *G06N 3/0472* (2013.01); *G06F 17/18* (2013.01); *G06N 3/08* (2013.01)

(58) Field of Classification Search
    CPC ......... G06N 3/0472; G06N 3/08; G06F 17/18
    See application file for complete search history.

(56) References Cited

U.S. PATENT DOCUMENTS

| 7,363,281 B2* | 4/2008 | Jin | G06N 3/126 706/19 |
| 2003/0191728 A1* | 10/2003 | Kulkarni | G06N 3/086 706/31 |
| 2019/0026639 A1* | 1/2019 | Vasudevan | G06T 7/0002 |
| 2019/0130267 A1* | 5/2019 | Norouzi | G06N 3/0445 |

OTHER PUBLICATIONS

Abolafia et al., "Neural program synthesis with priority queue training," arXiv:1801.03526, Mar. 2018, 16 pages.
Almeida et al., "Contributions to the study of sms spam filtering: New collection and results," Proceedings of the 11th ACM Symposium on Document Engineering, DocEng '11, Sep. 2011, 4 pages.
(Continued)

*Primary Examiner* — Reginald A Renwick
(74) *Attorney, Agent, or Firm* — Fish & Richardson P.C.

(57) ABSTRACT

Methods, systems, and apparatus, including computer programs encoded on computer storage media, for generating neural network architectures. One of the methods includes receiving a request to determine an architecture for a task neural network; maintaining data specifying a plurality of candidate architectures for the task neural network; repeatedly performing operations comprising: selecting one or more candidate architectures in the maintained data to be modified; generating a new candidate architecture from the selected candidate architecture by, for each hyperparameter in the set of hyperparameters, selecting the value for the hyperparameter for the new candidate architecture; and adding data specifying the new candidate architecture to the maintained data; and selecting, as the final architecture for the task neural network, one of the candidate architectures specified in the maintained data.

20 Claims, 7 Drawing Sheets

(56) References Cited

OTHER PUBLICATIONS

Bello et al., "Neural optimizer search with reinforcement learning," https://arxiv.org/abs/1709.07417, Sep. 2017, 12 pages.
Bergstra et al., "Random search for hyper-parameter optimization," JMLR, Feb. 2012, 281-305.
Cer et al., "Universal sentence encoder," arXiv:1803.11175, Apr. 2018, 7 pages.
Chen et al., "Reinforced Evolutionary Neural Architecture Search," https://arxiv.org/abs/1808.00193v1, Aug. 2018, 10 pages.
Cheng, et al., "Wide & Deep Learning for Recommender Systems," https://arxiv.org/abs/1606.07792, Jun. 2016, 4 pages.
Conti et al., "Improving Exploration in Evolution Strategies for Deep Reinforcement Learning via a Population of Novelty-Seeking Agents," https://arxiv.org/abs/1712.06560v1, Dec. 2017, 16 pages.
Cortes et al., "AdaNet: Adaptive Structural Learning of Artificial Neural Networks," https://arxiv.org/abs/1607.01097v2, Nov. 2016, 20 pages.
Cubuk et al., "AutoAugment: Learning augmentation policies from data," arXiv: 1805.09501, Oct. 2018, 14 pages.
Debole et al., "An analysis of the relative hardness of Reuters-21578 subsets," Journal of the American Society for Information Science and Technology, Feb. 2005, 56(6):584-596.
Duchi et al., "Adaptive subgradient methods for online learning and stochastic optimization," JMLR, Jul. 2011, 12:2121-2159.
Elsken et al., "Simple And Efficient Architecture Search for Convolutional Neural Networks," https://arxiv.org/abs/1711.04528, Nov. 2017, 14 pages.
Fahlman et al., "The Cascade-Correlation Learning Architecture," NIPS, 1990, retrieved from URL <https://pdfs.semanticscholar.org/98c6/0103f3de54f1378d52ba236f8d79d2936510.pdf?_ga=2.37291232.1321482201.1578507973-884353376.1575407077>, 524 532.
Falkner et al., "BOHB: Robust and Efficient Hyperparameter Optimization at Scale," https://arxiv.org/abs/1807.01774, Jul. 2018, 19 pages.
Floreano et al., "Neuroevolution: from architectures to learning," Evolutionary Intelligence, Jan. 2008, 1(1):47-62.
Francis et al., "Frequency analysis of english usage: lexicon and grammar," Boston: Houghton Mifflin, 1982, 64-70.
Goldberg et al., "A comparative analysis of selection schemes used in genetic algorithms," Foundations of Genetic Algorithms, Jan. 1991, 1:69-93.
Howard et al., "MobileNets: Efficient Convolutional Neural Networks for Mobile Vision Applications," https://arxiv.org/abs/1704.04861, Apr. 2017, 9 pages.
Hu et al., "Squeeze-and-Excitation Networks," IEEE Conference on Computer Vision and Pattern Recognition (CVPR), 2018, 7132-7141.
Hutter et al., "Sequential Model-Based Optimization for General Algorithm Configuration," International Conference on Learning and Intelligent Optimization, 2011, 507-523.
Kingma et al., "Adam: A Method for Stochastic Optimization," https://arxiv.org/abs/1412.6980v1, Dec. 2014, 9 pages.
Lang, "NewsWeeder: Learning to Filter Netnews," International Conference on Machine Learning, Jul. 1995, 9 pages.
Li et al., "Random Search and Reproducibility for Neural Architecture Search," https://arxiv.org/abs/1902.07638v1, Feb. 2019, 21 pages.
Lichman, "UCI machine learning repository," retrieved on Jan. 3, 2020, retrieved from URL <https://archive.ics.uci.edu/ml/index.php>, 2013, 2 pages.
Liu et al., "DARTS: Differentiable Architecture Search," https://arxiv.org/abs/1806.09055v1, Jun. 2018, 12 pages.
Liu et al., "Progressive neural architecture search," arXiv:1712.00559, Dec. 2017, 11 pages.
McMahan, "Follow-the-regularized-leader and mirror descent: Equivalence theorems and L1 regularization," Proceedings of the Fourteenth International Conference on Artificial Intelligence and Statistics, Jun. 2011, 15:525-533.
Negrinho et al., "DeepArchitect: Automatically designing and training deep architectures," ICCV, Apr. 2017, 12 pages.
Pham et al., "Efficient neural architecture search via parameter sharing," arXiv:1802.03268, Feb. 2018, 11 pages.
Ramachandran, et al., "Searching for activation functions," arXiv:1710.05941, Oct. 2017, 13 pages.
Real et al., "Large-scale evolution of image classifiers," ICML, Jun. 2017, 18 pages.
Real et al., "Regularized evolution for image classifier architecture search," arXiv: 1802.01548, Oct. 2018, 16 pages.
Russakovsky et al., "ImageNet Large Scale Visual Recognition Challenge," International Journal of Computer Vision, Apr. 2015, 115:211-252.
Sciuto et al., "Evaluating the Search Phase of Neural Architecture Search," https://arxiv.org/abs/1902.08142v1, Feb. 2019, 10 pages.
So et al., "The Evolved Transformer," https://arxiv.org/abs/1901.11117v1, Jan. 2019, 14 pages.
Stanley et al., "A hypercube-based encoding for evolving large-scale neural networks," Artificial Life, Apr. 2009, 15(2):185-212.
Such et al., "Deep neuroevolution: Genetic algorithms are a competitive alternative for training deep neural networks for reinforcement learning," arXiv:1712.06567, Dec. 2017, 15 pages.
Szegedy et al., "Going deeper with convolutions," 2015 IEEE Conference on Computer Vision and Pattern Recognition (CVPR), Jun. 2015, 9 pages.
Tan et al., "MnasNet: Platform-Aware Neural Architecture Search for Mobile," https://arxiv.org/abs/1807.11626v1, Jul. 2018, 9 pages.
Wichrowska et al., "Learned optimizers that scale and generalize," ICML, Sep. 2017, 11 pages.
Williams, "Simple statistical gradient-following algorithms for connectionist reinforcement learning," Reinforcement Learning, May 1992, 8(3-4):229-256.
Wong et al., "Transfer automatic machine learning," https://arxiv.org/abs/1803.02780v2, Apr. 2018, 17 pages.
Xie et al., "Genetic CNN," 2017 IEEE International Conference on Computer Vision (ICCV), Oct. 2017, 1379-1388.
Xie et al., "SNAS: Stochastic Neural Architecture Search," https://arxiv.org/abs/1812.09926v1, Dec. 2018, 17 pages.
Ying et al., "NAS-Bench-101: Towards Reproducible Neural Architecture Search," https://arxiv.org/abs/1902.09635v1, Feb. 2019, 19 pages.
Zhang et al., "ShuffleNet: An Extremely Efficient Convolutional Neural Network for Mobile Devices," https://arxiv.org/abs/1707.01083v2, Dec. 2017, 9 pages.
Zhong et al., "Practical block-wise neural network architecture generation," CVPR, Jun. 2018, 2423-2432.
Zoph et al., "Learning transferable architectures for scalable image recognition," CoRR, Dec. 2017, 14 pages.
Zoph et al., "Neural architecture search with reinforcement learning," ICLR, Feb. 2017, 16 pages.

\* cited by examiner

| Parameters | Search space |
| --- | --- |
| 1) Input embedding modules | |
| 2) Fine-tune input embedding module | {True, False} |
| 3) Use convolution | {True, False} |
| 4) Convolution activation | {relu, relu6, leaky relu, swish, sigmoid, tanh} |
| 5) Convolution batch norm | {True, False} |
| 6) Convolution max ngram length | {2, 3} |
| 7) Convolution dropout rate | {0.0, 0.1, 0.2, 0.3, 0.4} |
| 8) Convolution number of filters | {32, 64, 128} |
| 9) Number of hidden layers | {0, 1, 2, 3, 5} |
| 10) Hidden layers size | {64, 128, 256} |
| 11) Hidden layers activation | {relu, relu6, leaky relu, swish, sigmoid, tanh} |
| 12) Hidden layers normalization | {none, batch norm, layer norm} |
| 13) Hidden layers dropout rate | {0.0, 0.05, 0.1, 0.2, 0.3, 0.4, 0.5} |
| 14) Deep optimizer name | {adagrad, lazy adam} |
| 15) Lazy adam batch size | {128, 256} |
| 16) Deep tower learning rate | {0.001, 0.005, 0.01, 0.05, 0.1, 0.5} |
| 17) Deep tower regularization weight | {0.0, 0.0001, 0.001, 0.01} |
| 18) Wide tower learning rate | {0.001, 0.005, 0.01, 0.05, 0.1, 0.5} |
| 19) Wide tower regularization weight | {0.0, 0.0001, 0.001, 0.01} |
| 20) Number of training samples | {1e5, 2e5, 5e5, 1e6, 2e6, 5e6} |

FIG. 7

HYBRID NEURAL ARCHITECTURE SEARCH

CROSS-REFERENCE TO RELATED APPLICATION

This application claims priority to U.S. Provisional Application No. 62/737,847, filed on Sep. 27, 2018. The disclosure of the prior application is considered part of and is incorporated by reference in the disclosure of this application.

BACKGROUND

This specification relates to determining architectures for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines a network architecture for a task neural network that is configured to perform a particular machine learning task.

The subject matter described in this specification can be implemented in particular embodiments so as to realize one or more of the following advantages. By determining the architecture of a task neural network using the techniques described in this specification, the system can determine a network architecture that achieves or even exceeds state of the art performance on any of a variety of machine learning tasks, e.g., image classification or another image processing task. Additionally, the system can determine this architecture in a manner that is much more computationally efficient than existing techniques, i.e., that consumes many fewer computational resources than existing techniques. In particular, many existing techniques rely solely on the controller neural network being trained to generate the candidate architectures that are evaluated at a given step in the training process. This results in significant computational resources being expended on evaluating candidate architectures that do not perform well, particularly during the significant and time- and resource-intensive phase in which the controller learns the patterns involved in selecting high-performing architectures, i.e., before the controller begins suggesting architectures that take advantage of the learned patterns. The described systems, on the other hand, use the controller neural network only for mutating, i.e., modifying, candidate architectures that have been selected using an evolutionary process. This allows the system to exploit good trials from the outset of the architecture search process while allowing the controller to learn biases and complex patterns and therefore steer the search in the right direction. This results in identifying a very high performing architecture while being much more sample-efficient and requiring many fewer computational resources than existing techniques. That is, many fewer candidate architectures need to be generated and evaluated through training, which is extremely computationally intensive, before a high quality architecture is identified. Additionally, as opposed to purely evolutionary approaches, the system is able to learn successful mutation patterns through training the controller neural network and does not constantly mutate at random. This allows the system to more efficiently identify high performing architectures and results in the architecture search process consuming many fewer computational resources than a purely evolutionary approach, again because many fewer architectures need to be evaluated before a high quality architecture is identified.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that determines a network architecture for a task neural network that is configured to perform a particular machine learning task.

The task neural network can be configured to receive any kind of digital data input and to generate any kind of score, classification, or regression output based on the input.

For example, if the inputs to the task neural network are images or features that have been extracted from images, the output generated by the task neural network for a given image may be scores for each of a set of object categories, with each score representing an estimated likelihood that the image contains an image of an object belonging to the category.

As another example, if the inputs to the task neural network are Internet resources (e.g., web pages), documents, or portions of documents or features extracted from Internet resources, documents, or portions of documents, the output generated by the task neural network for a given Internet resource, document, or portion of a document may be a score for each of a set of topics, with each score representing an estimated likelihood that the Internet resource, document, or document portion is about the topic.

As another example, if the inputs to the task neural network are features of an impression context for a particular advertisement, the output generated by the task neural network may be a score that represents an estimated likelihood that the particular advertisement will be clicked on.

As another example, if the inputs to the task neural network are features of a personalized recommendation for a user, e.g., features characterizing the context for the recommendation, e.g., features characterizing previous actions taken by the user, the output generated by the task neural network may be a score for each of a set of content items, with each score representing an estimated likelihood that the user will respond favorably to being recommended the content item.

As another example, if the input to the task neural network is a sequence of text in one language, the output generated by the task neural network may be a score for each of a set of pieces of text in another language, with each score representing an estimated likelihood that the piece of text in the other language is a proper translation of the input text into the other language.

As another example, if the input to the task neural network is a sequence representing a spoken utterance, the output generated by the task neural network may be a score for each of a set of pieces of text, each score representing an estimated likelihood that the piece of text is the correct transcript for the utterance.

In some cases, the task neural network is a convolutional neural network that is configured to receive an input image and to process the input image to generate a network output for the input image, i.e., to perform some kind of image processing task. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted.

The system determines the architecture of the task neural network using a hybrid between an evolution approach and a neural architecture search approach. In particular, the system uses a controller neural network in determining how to mutate, i.e., modify, candidate architectures while searching for the optimal architecture.

Figure 1:
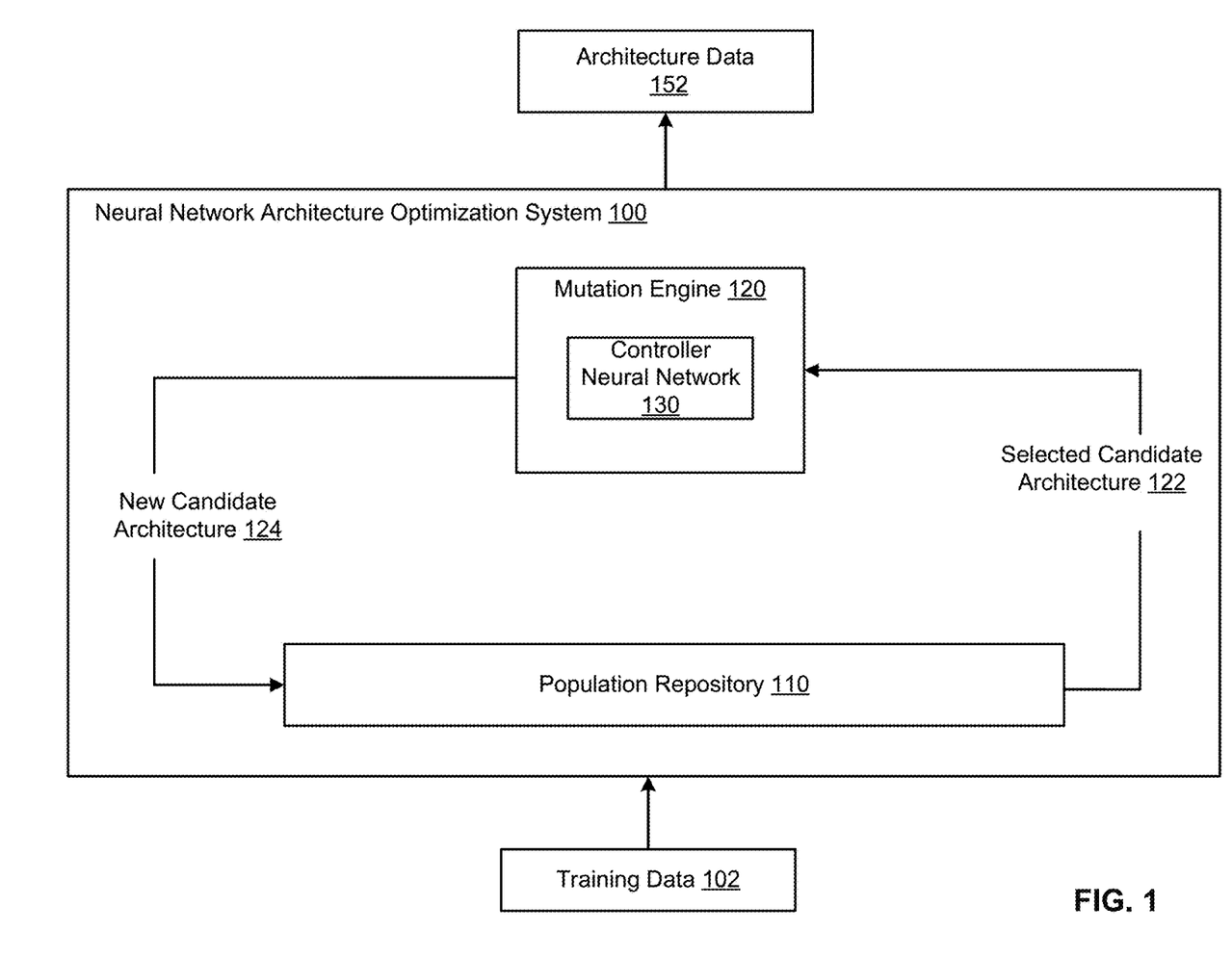
FIG. 1 shows an architecture of an example neural network architecture optimization system.

FIG. 1 shows an example neural network architecture optimization system 100. The neural network architecture optimization system 100 is an example of a system implemented as computer programs on one or more computers in one or more locations, in which the systems, components, and techniques described below can be implemented.

The neural network architecture optimization system 100 is a system that receives, i.e., from a user of the system, training data 102 for training a task neural network to perform a machine learning task and uses the training data 102 to determine an optimal neural network architecture for performing the machine learning task and to train a task neural network having the optimal neural network architecture to determine trained values of parameters of the neural network. Optimal in this specification refers best performing architecture with respect to the candidate architectures that are evaluated during an architecture search procedure (and not to an architecture that "optimal" in an absolute sense).

The training data 102 generally includes multiple training examples and a respective target output for each training example. The target output for a given training example is the output that should be generated by the trained task neural network by processing the given training example. The system 100 divides the received training data into a training subset, a validation subset, and, optionally, a test subset.

The system 100 can receive the training data 102 in any of a variety of ways. For example, the system 100 can receive training data as an upload from a remote user of the system over a data communication network, e.g., using an application programming interface (API) made available by the system 100. As another example, the system 100 can receive an input from a user specifying which data that is already maintained by the system 100 should be used as the training data 102.

The neural network architecture optimization system 100 generates architecture data 152 that specifies an optimal architecture of the task neural network and, optionally, trained values of the parameters of a trained neural network having the optimal architecture.

Once the neural network architecture optimization system 100 has generated the data 152, the neural network architecture optimization system 100 can instantiate a trained neural network that has the optimal architecture and use the trained neural network to process new received inputs to perform the machine learning task, e.g., through the API provided by the system. That is, the system 100 can receive inputs to be processed, use the trained neural network to process the inputs, and provide the outputs generated by the trained neural network or data derived from the generated outputs in response to the received inputs.

Instead or in addition, the system 100 can store the data 152 for later use in instantiating a trained neural network, or can transmit the data 152 to another system for use in instantiating a trained neural network, or output the data 152 to the user that submitted the training data.

The machine learning task is a task that is specified by the user that submits the training data 102 to the system 100.

In some implementations, the user explicitly defines the task by submitting data identifying the task to the neural network architecture optimization system 100 with the training data 102. For example, the system 100 may present a user interface on a user device of the user that allows the user to select the task from a list of tasks supported by the system 100. That is, the neural network architecture optimization system 100 can maintain a list of machine learning tasks, e.g., image processing tasks like image classification, speech recognition tasks, natural language processing tasks like sentiment analysis, and so on. The system 100 can allow the user to select one of the maintained tasks as the task for which the training data is to be used by selecting one of the tasks in the user interface.

In some other implementations, the training data 102 submitted by the user specifies the machine learning task.

That is, the neural network architecture optimization system 100 defines the task as a task to process inputs having the same format and structure as the training examples in the training data 102 in order to generate outputs having the same format and structure as the target outputs for the training examples. For example, if the training examples are images having a certain resolution and the target outputs are one-thousand dimensional vectors, the system 100 can identify the task as a task to map an image having the certain resolution to a one-thousand dimensional vector. For example, the one-thousand dimensional target output vectors may have a single element with a non-zero value. The position of the non-zero value indicates which of 1000 classes the training example image belongs to. In this example, the system 100 may identify that the task is to map an image to a one-thousand dimensional probability vector. Each element represents the probability that the image belongs to the respective class. The CIFAR-1000 dataset, which consists of 50000 training examples paired with a target output classification selected from 1000 possible classes, is an example of such training data 102. CIFAR-10 is a related dataset where the classification is one of ten possible classes. Another example of suitable training data 102 is the MNIST dataset where the training examples are images of handwritten digits and the target output is the digit which these represent. The target output may be represented as a ten dimensional vector having a single non-zero value, with the position of the non-zero value indicating the respective digit.

The neural network architecture optimization system 100 includes a population repository 110.

The population repository 110 is implemented as one or more storage devices in one or more physical locations and stores data specifying the current population of candidate neural network architectures at any given time during the architecture search process. At the outset of the architecture search process, the system 100 can initialize the population repository with one or more default neural network architectures.

The population repository 110 stores population data including, for each candidate architecture in the population of candidate architectures, (i) data defining the candidate architecture, and (ii) data specifying a measure of fitness for a neural network having the candidate architecture.

Each of the candidate architectures in the population is defined by respective values of a set of hyperparameters. The set of hyperparameters can include any of a variety of hyperparameters that, once selected, collectively define the architecture of the neural network and, optionally, how the training of the neural network should proceed. For example, the set can define the operations performed by all of the layers in the network, or just a portion of the layers of the network, with the hyperparameters of the other layers being fixed. As another example, the set can define how many layers there are of certain types in the neural network. Examples of hyperparameter sets that define a search space to be explored by the system 100 are given below with reference to FIGS. 6 and 7.

The system 100 iteratively updates the population of possible neural network architectures in the population repository 102 to improve the fitness of the population.

In particular, at each iteration, the system 100 selects one or more candidate architectures 122 from the population. This is described below with reference to FIG. 3.

A mutation engine 120 then determines a new candidate architecture 124 from each selected candidate architecture 122 using a controller neural network 130. That is, the mutation engine 120 uses the controller neural network 130 to mutate the candidate architecture 122 to generate a new candidate architecture 124. Thus, unlike conventional evolutionary techniques, the mutation engine 120 does not mutate the candidate architecture randomly to generate the new candidate architecture and can instead modify the candidate architecture in a way that leverages learned mutation patterns, i.e., patterns that have been learned by the controller neural network 130.

Generating a new candidate architecture using the controller neural network 130 is described in more detail below with reference to FIG. 2.

The system 100 then trains, for each new candidate architecture 124, a new neural network having the new candidate architecture on a training subset of the training data 102 to determine trained values of parameters of the new neural network.

The system 100 determines, for each new candidate architecture 124, a measure of fitness by evaluating a performance of the trained new neural network on a validation subset of the training data. The measure of fitness can be any measure that is appropriate for the machine learning task and that measures the performance of the neural network on the machine learning task. For example, measures of fitness can include various classification errors, intersection-over-union measures, reward or return metrics, and so on.

The system then adds the new candidate architecture 124 to the population and optionally removes from the population one or more candidate architectures, e.g., one or more candidates that were trained least recently or that have the worst measures of fitness.

Once termination criteria for the training have been satisfied (e.g., after more than a threshold number of iterations have been performed or after the best fit candidate neural network in the population repository has a fitness that exceeds a threshold), the neural network architecture optimization system 100 selects an optimal neural network architecture from the architectures remaining in the population or, in some cases, from all of the architectures that were in the population at any point during the training.

In particular, in some implementations, the neural network architecture optimization system 100 selects the architecture in the population that has the best measure of fitness. In other implementations, the neural network architecture optimization system 100 tracks measures of fitness for architectures even after those architectures are removed from the population and selects the architecture that has the best measure of fitness using the tracked measures of fitness.

To generate the data 152, in some implementations, the neural network architecture optimization system 100 obtains the trained values for the parameters of a trained neural network having the optimal neural network architecture from the population repository 110. In some other implementations, the system 100 trains a neural network having the optimized architecture, e.g., either from scratch or to fine-tune the parameter values generated as a result of determining the optimized architecture for the neural network. The system can further train the neural network having the optimized neural network architecture on more training data to determine the final trained values of the trained neural network.

The system 100 then uses the trained neural network to process requests received by users, e.g., through the API provided by the system. In other implementations, the system can provide the data specifying the optimized architecture and, optionally, the trained parameter values, in response to receiving the training data 102, e.g., to a user over a data communication network.

In implementations where the system 100 generates a test subset from the training data, the system also tests the performance of a trained neural network having the optimized neural network architecture on the test subset to determine a measure of fitness of the trained neural network on the user-specified machine learning task. The system 100 can then provide the measure of fitness for presentation to the user that submitted the training data or store the measure of fitness in association with the trained values of the parameters of the trained neural network.

Figure 2:
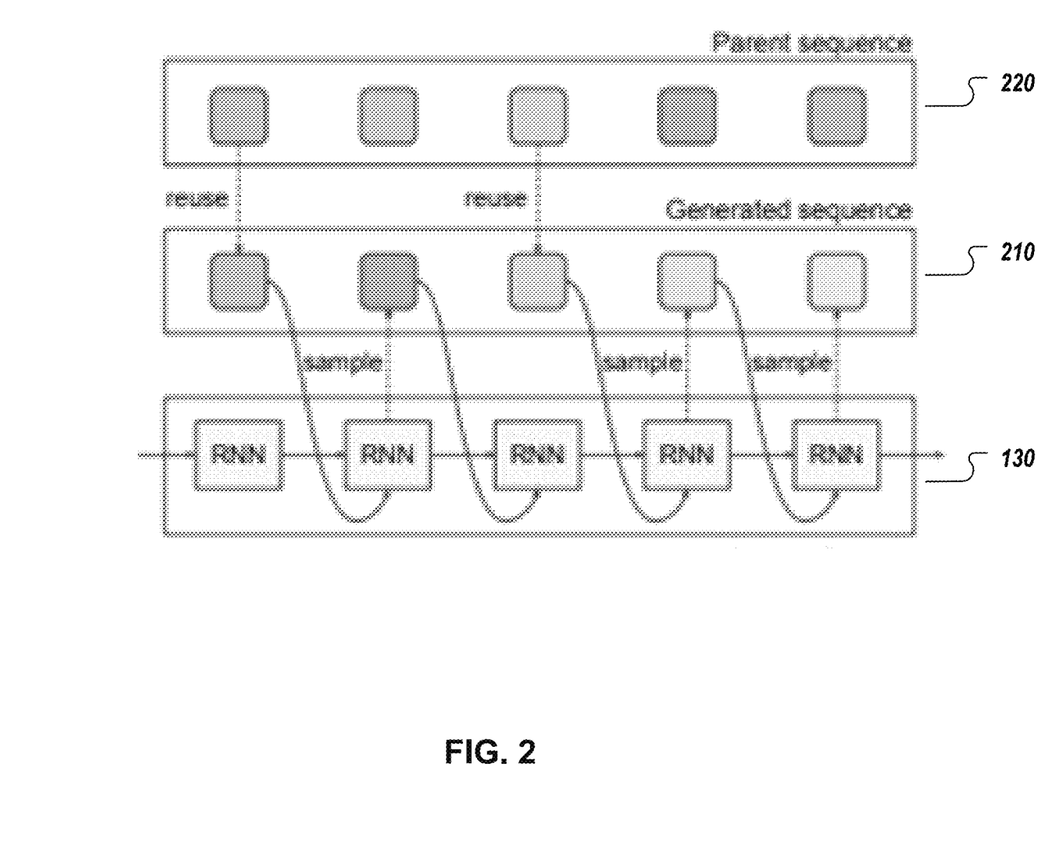
FIG. 2 is an illustration of generating a new candidate architecture using the controller neural network.

FIG. 2 illustrates an example of generating data specifying a new architecture from data specifying an existing candidate architecture using the controller neural network 130.

In particular, FIG. 2 shows how a parent sequence 220 of hyperparameters that define the existing candidate architecture is used to generate a new sequence 230 of hyperparameters that define the new architecture. Both sequences have the same number of time steps, i.e., are defined by the same number of hyperparameters. In particular, both sequences include a respective value for each hyperparameter in the set of hyperparameters that defines the corresponding architecture. That is, each time step corresponds to a different hyperparameter from the set, and the sequence at that time step includes the value for the corresponding hyperparameter.

At a high level, the system generates, using the controller neural network 130 and in accordance with current values of the parameters of controller neural network (referred to in this specification as "controller parameters"), a respective score distribution over possible values for each hyperparameter in the set of hyperparameters, i.e., a respective score distribution at each time step.

The system generates the new candidate architecture from the selected candidate architecture by, for each hyperparameter in the set of hyperparameters, i.e., for each time step, selecting the value for the hyperparameter for the new candidate architecture to be either (i) the value for the hyperparameter for the selected candidate architecture, i.e., the value in the parent sequence 220 at that time step, or (ii) a value selected using the score distribution generated by the controller neural network 130 for the hyperparameter, i.e., the score distribution generated by the controller neural network 130 at that time step.

That is, at each time step, the system determines to either "reuse" or "sample." When the system determines to "reuse," the system includes, in the new sequence 210, the value from the parent sequence 220 at that time step. When the system determines to "sample," the system uses the score distribution generated by the controller neural network 130 for the hyperparameter to select the value in the new sequence 210 at the time step. For example, the system can sample a value from the possible values in accordance with the probability distribution.

As described above, the controller neural network 130 is configured to process for a plurality of time steps, with each time step corresponding to a respective hyperparameter from the set of hyperparameters.

At each of the time steps, the controller neural network 130 is configured to receive a controller input for the time step and process the controller input to generate a score distribution over possible values for the hyperparameter corresponding to the time step conditioned on the hyperparameter values that were selected for the new candidate architecture at previous time steps, i.e., values for hyperparameters corresponding to previous time steps. For example, the controller neural network 130 can be a recurrent neural network that, at each time step, receives a controller input that includes the value that was selected for the hyperparameter corresponding to the time step immediately preceding the particular time step (regardless of whether the system "sampled" or "reused" at that preceding time step).

Thus, to generate the respective score distribution over possible values for each hyperparameter in the set of hyperparameters, at each particular time step of the plurality of time steps, the system provides as (at least part of) the controller input for the particular time step the value that was selected for the hyperparameter corresponding to the time step immediately preceding the particular time step.

When determining whether to set the value to be (i) the value for the hyperparameter for the selected candidate architecture or (ii) a value selected using the score distribution generated by the controller neural network for the hyperparameter (i.e., determining whether to "reuse" or "sample"), the system selects the value for the hyperparameter for the selected candidate architecture with probability p and selects the value selected using the score distribution generated by the controller neural network for the hyperparameter with probability 1−p, where p is a specified value between zero and one. For example, the system can randomly sample a value between zero and one, inclusive. When the sampled value is less than or equal to p, the system can select the value for the hyperparameter for the selected candidate architecture. When the value exceeds p, the system can select the value using the score distribution.

In the example of FIG. 2, the system determines to "reuse" at time step 1, to "sample" at time step 2, to "reuse" at time step 3, to "sample" at time step 4, and to "sample" at time step 5. It is noted that even when the system determines to "reuse" at a given time step, the value that is selected at that time step (i.e., the value from the parent sequence at that time step), is still provided as part of the controller input to the controller neural network 130 at the next time step. This is shown in FIG. 2 as a curved line from the new sequence 220 to the controller neural network 130. Because the controller neural network 130 is a recurrent neural network, FIG. 2 also shows the internal state of the controller being updated at each time step and propagated for use at the next time step, i.e., through arrows between the blocks representing the controller at each time step.

While iteratively generating new sequences as part of the search process, the system also trains the controller neural network 130 so that the probability distributions generated by the controller neural network 130 result in new candidate sequences having better measures of fitness. In particular, the system trains the controller neural network 130 based on measures of fitness of already evaluated candidate architectures.

By generating the new sequence in this manner and by training the controller neural network during the architecture search, the system leverages both the already high quality existing candidate architecture (at time steps where the system determines to "reuse") and the patterns that have been learned by the controller 130 (at time steps where the system determines to "sample") in generating new candidate architectures for consideration.

Training the controller neural network 130 is described in more detail below with reference to FIGS. 4 and 5.

Figure 3:
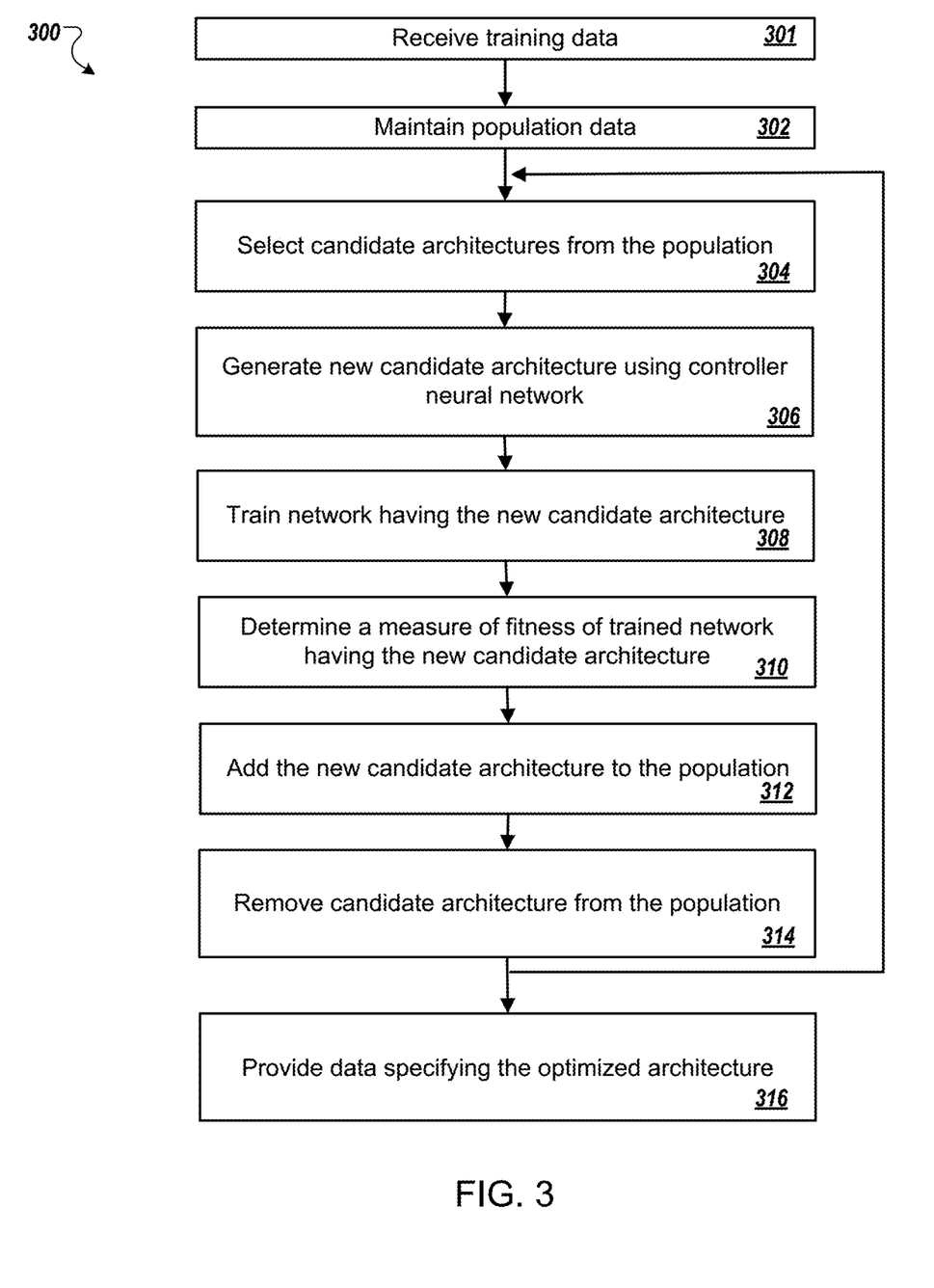
FIG. 3 is a flow diagram of an example process for determining an optimized neural network architecture for performing a machine learning task.

FIG. 3 is a flow diagram of an example process for determining an optimized neural network architecture for performing a machine learning task. For convenience, the process 300 will be described as being performed by a system of one or more computers located in one or more locations. For example, a neural network architecture optimization system, e.g., the neural network architecture optimization system 100 of FIG. 1, appropriately programmed in accordance with this specification, can perform the process 300.

The system receives training data for training a task neural network to perform a machine learning task (step 301). The training data includes a plurality of training examples and a respective target output for each of the training examples. The system divides the received training data into a training subset, a validation subset, and, optionally, a test subset.

The system maintains population data in a population repository (step 302). The system can initialize the population repository with one or more default neural network architectures. The population data includes, for each candidate architecture in a population of candidate architectures, (i) data defining the candidate architecture, i.e., the hyperparameters that define the candidate architecture and (ii) a measure of fitness of a neural network having the candidate architecture.

The system repeatedly performs the following steps 304-314. In some cases, the system can perform the steps 304-314 asynchronously using each of a plurality of worker computing units until termination criteria for the training have been satisfied. That is, the system may perform multiple instances of steps 304-314 in parallel on different worker computing units, i.e., on different hardware devices or on different software threads on the same hardware device.

The system selects a candidate architecture from the population (step 304). In particular, to select a candidate architecture the system can identify a plurality of candidate architectures from the candidate architectures specified in the population data, e.g., by selecting a fixed number of architectures at random. The system then determines, for each identified architecture and by accessing the maintained population data, a measure of fitness of a trained neural network having the candidate architecture and selects, as the candidate architecture to be modified, the identified architecture having the best fitness.

The system generates, using the controller neural network, a new candidate architecture from the selected candidate architecture (step 306). In particular, as described above, the system generates, using the controller neural network and in accordance with current values of the controller parameters, a respective score distribution over possible values for each hyperparameter in the set of hyperparameters and generates a new candidate architecture from the selected candidate architecture by, for each hyperparameter in the set of hyperparameters, selecting the value for the hyperparameter for the new candidate architecture from among (i) the value for the hyperparameter for the selected candidate architecture and (ii) a value selected using the score distribution generated by the controller neural network for the hyperparameter.

The system trains a new neural network having the candidate architecture on a training subset of the training data to determine trained values of parameters of the new neural network (step 308). For example, the system can train the new neural network for a set number of training epochs, for a set amount of time, or until the performance of the neural network has converged.

The system determines a measure of fitness by evaluating a performance of the trained new neural network on a validation subset of the training data (step 310). The measure of fitness can be any measure that is appropriate for the machine learning task and that measures the performance of the neural network on the machine learning task. For example, measures of fitness can include various classification errors, intersection-over-union measures, reward or return metrics, and so on.

The system adds the new candidate architecture to the population and associates the new candidate architecture with the measure of fitness (step 312).

Optionally, the system removes from the population one or more candidate architectures, e.g., the one or more architectures that were trained least recently or that have the worst measures of fitness (step 314).

After the termination criteria have been satisfied, the system provides data specifying the optimized architecture (step 316). In particular, the system selects the best fit candidate neural network architecture as the optimized neural network architecture to be used to carry out the machine learning task. That is, the termination criteria have been satisfied, e.g., after more than a threshold number of iterations have been performed or after the best fit candidate neural network in the population repository has a fitness that exceeds a threshold, the system selects the best fit candidate neural network architecture as the final neural network architecture be used in carrying out the machine learning task.

In some implementations, the system obtains the trained values for the parameters of a trained neural network having the optimized neural network architecture from the population repository. In some other implementations, the system trains a neural network having the optimized architecture, e.g., either from scratch or to fine-tune the parameter values generated as a result of determining the optimized architecture for the neural network. The system can further train the neural network having the optimized neural network architecture on more training data to determine the final trained values of the trained neural network.

The system then uses the trained neural network to process requests received by users, e.g., through the API provided by the system. In other implementations, the system can provide the data specifying the optimized architecture and, optionally, the trained parameter values, in response to receiving the training data, e.g., to a user over a data communication network.

In implementations where the system generates a test subset from the training data, the system also tests the performance of a trained neural network having the optimized neural network architecture on the test subset to determine a measure of fitness of the trained neural network on the user-specified machine learning task. The system can then provide the measure of fitness for presentation to the user that submitted the training data or store the measure of fitness in association with the trained values of the parameters of the trained neural network.

Figure 4:
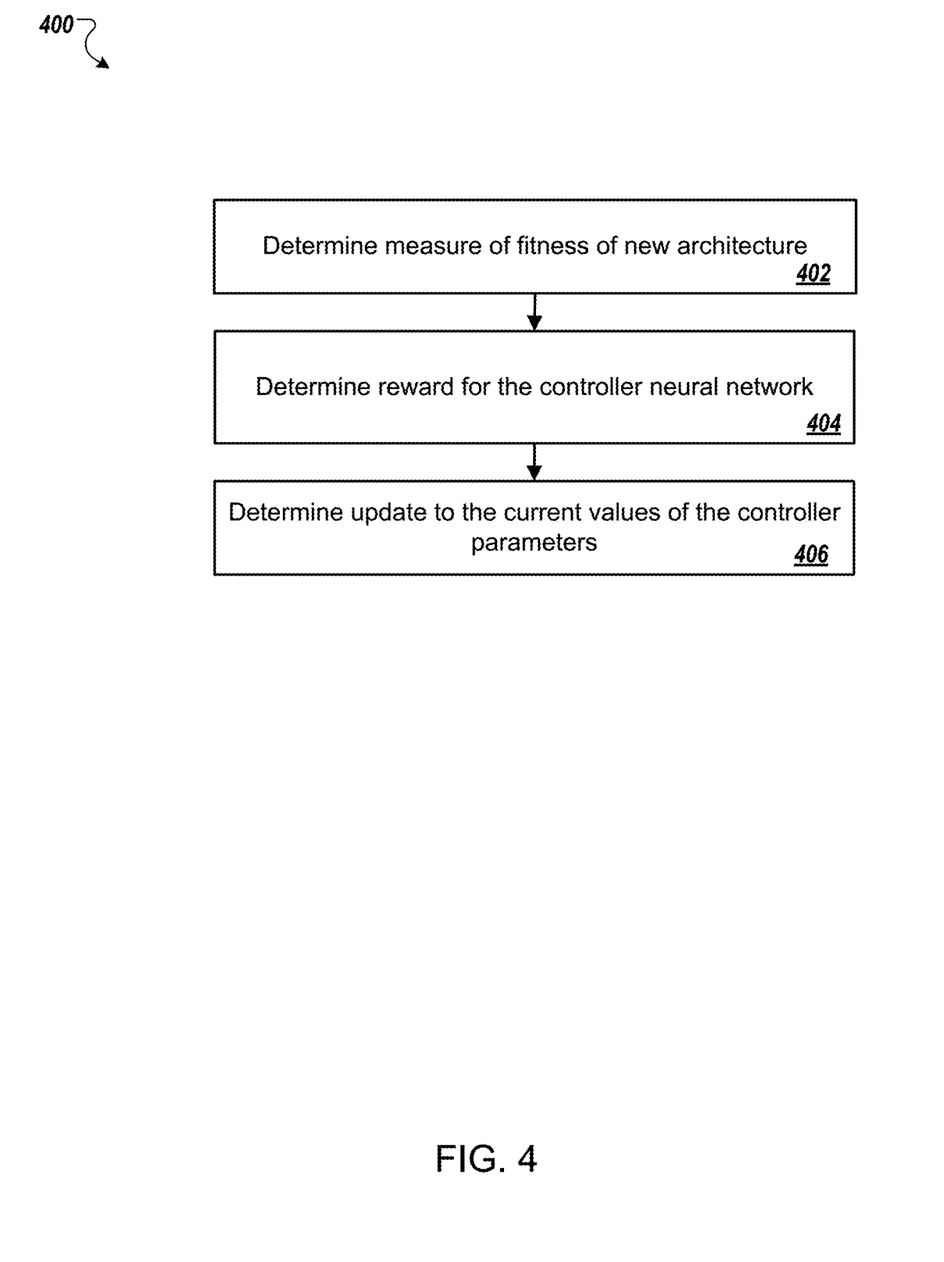
FIG. 4 is a flow diagram of an example process for updating the current values of the controller parameters.

FIG. 4 is a flow diagram of an example process 400 for determine an update to the controller parameters. For convenience, the process 400 will be described as being performed by a system of one or more computers located in one or more locations. For example, a neural network architecture optimization system, e.g., the neural network architecture optimization system 100 of FIG. 1, appropriately programmed in accordance with this specification, can perform the process 400.

The system can repeatedly perform the process 400 to train the controller neural network, i.e., to repeatedly adjust the values of the controller parameters, as the architecture search progresses. By adjusting the values of the controller parameters, the system causes the controller neural network to propose mutations that result in new architectures that perform better on the particular task.

The system determines the measure of fitness for the trained neural network having a new architecture (step 402) as described above.

The system determines a reward for the controller neural network based on (i) the measure of fitness for the new candidate architecture and (ii) the scores assigned to the values of the hyperparameters that define the new candidate architecture by the controller neural network (step 404). For example, the reward can be the log likelihood of the new candidate architecture according to the scores generated by the controller for the hyperparameter values in the sequence multiplied by a value that is based on the performance metric, e.g., the performance metric, the square of the performance metric, the cube of the performance metric, the square root of the performance metric, and so on. In some cases, i.e., when a lower performance metric is better, the system can multiply the log likelihood by the negative of the value that is based on the performance metric.

The system determines an update to the current values of the controller parameters based on the reward using a reinforcement learning technique (step 406). In particular, the reinforcement learning technique can be a policy gradient technique, e.g., REINFORCE, that adjusts the current values of the controller parameters to increase the expected reward that is received for sequences generated based on the outputs of the controller neural network.

Figure 5:
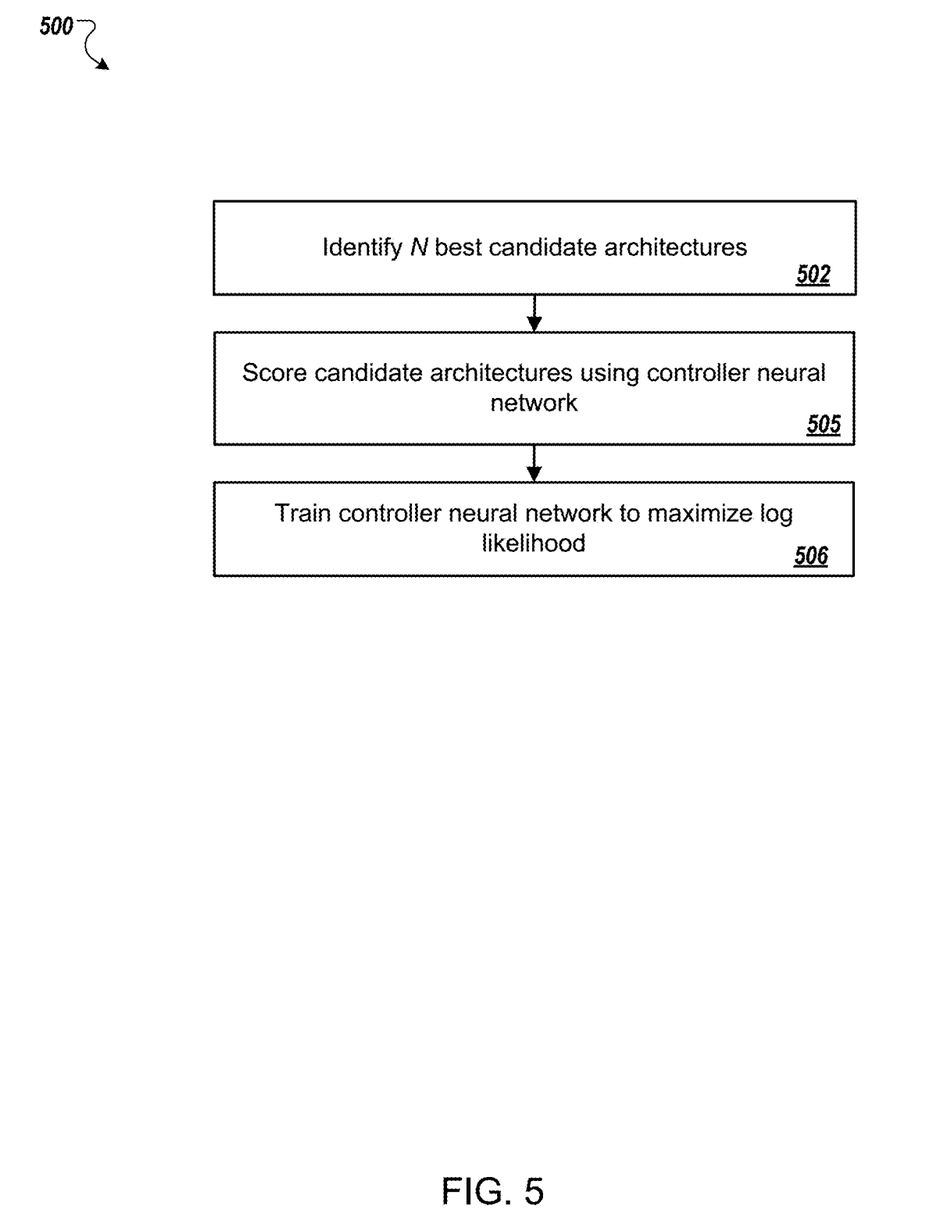
FIG. 5 is a flow diagram of another example process for updating the current values of the controller parameters.

FIG. 5 is a flow diagram of an example process 500 for determine an update to the controller parameters. For convenience, the process 500 will be described as being performed by a system of one or more computers located in one or more locations. For example, a neural network architecture optimization system, e.g., the neural network architecture optimization system 100 of FIG. 1, appropriately programmed in accordance with this specification, can perform the process 500.

The system can repeatedly perform the process 500 to train the controller neural network.

The system identifies the N candidate architectures in the population that currently have the best measures of fitness (step 502). N is generally a fixed number, e.g., one, five, or ten, that defines the mini-batch size used to train the controller neural network.

The system scores each of the N candidate architectures using the controller neural network (step 504). That is, for each of the N architectures, the system determines the score that is assigned to each hyperparameter value that defines the architecture by the corresponding score distribution generated by the controller.

The system updates the controller parameters by training the controller neural network to maximize the log likelihood for the hyperparameter values that define the N candidate neural network architectures using supervised learning (step 506). That is, the system can perform an iteration of a conventional supervised learning technique, e.g., stochastic gradient descent, rmsProp, or Adam, to update the controller parameters to maximize the log likelihoods.

Figure 6:
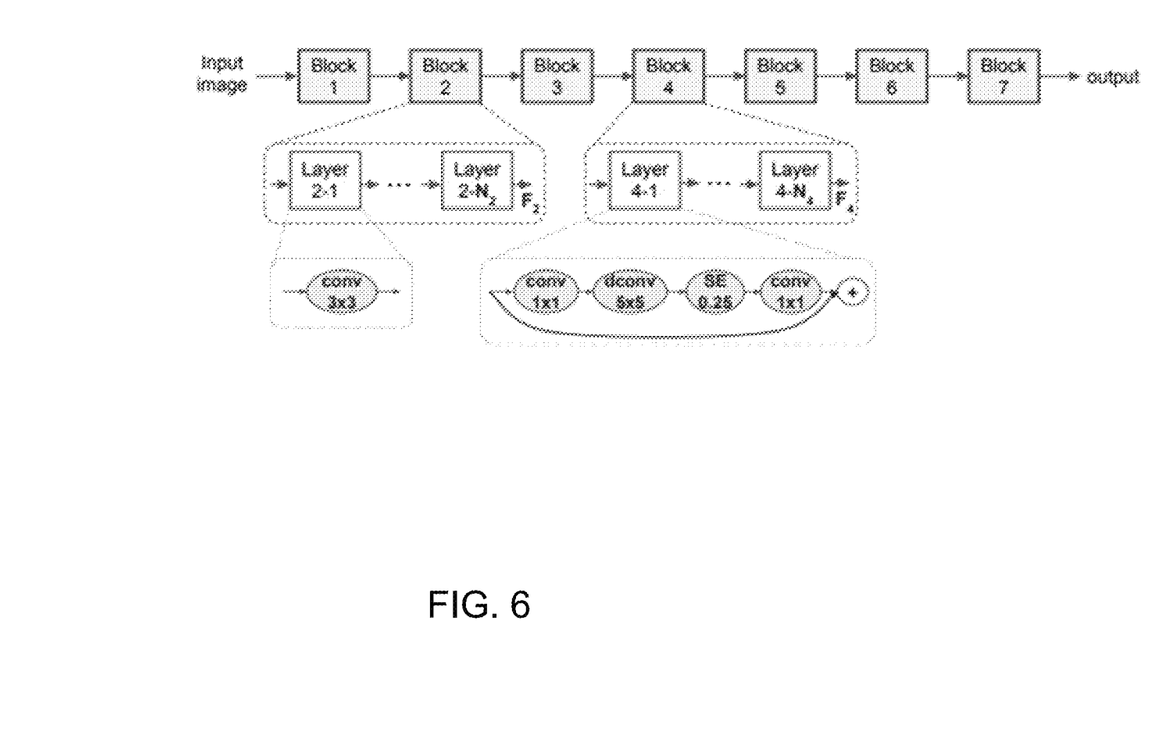
FIG. 6 illustrates an example search space for an image classification task.

FIG. 6 illustrates an example search space for an image classification task. Network layers are grouped into a number of predefined skeletons, called "blocks," based on their input resolutions and filter sizes. Each block contains a variable number of repeated identical layers, where only the first layer has stride 2 if input/output resolutions are different but all other layers have stride 1. For each block, the system searches for the operations and connections for a single layer and the number of layers N, then the same layer is repeated N times (e.g., Layer 4-1 to 4-N4 are the same). Layers from different blocks (e.g., Layer 2-1 and 4-1) can be different. Thus, for each block, the hyperparameters might include any of: the number of layers, the type of convolution performed, the kernel size of the convolution, the squeeze-and-excitation ratio, the type of skip connection, if any, that is included from the input to the layer to the output of the layer, and the filter size. In other words, the sequence representing the architecture would include, for each block, a respective time step for each of these hyperparameters.

Figure 7:
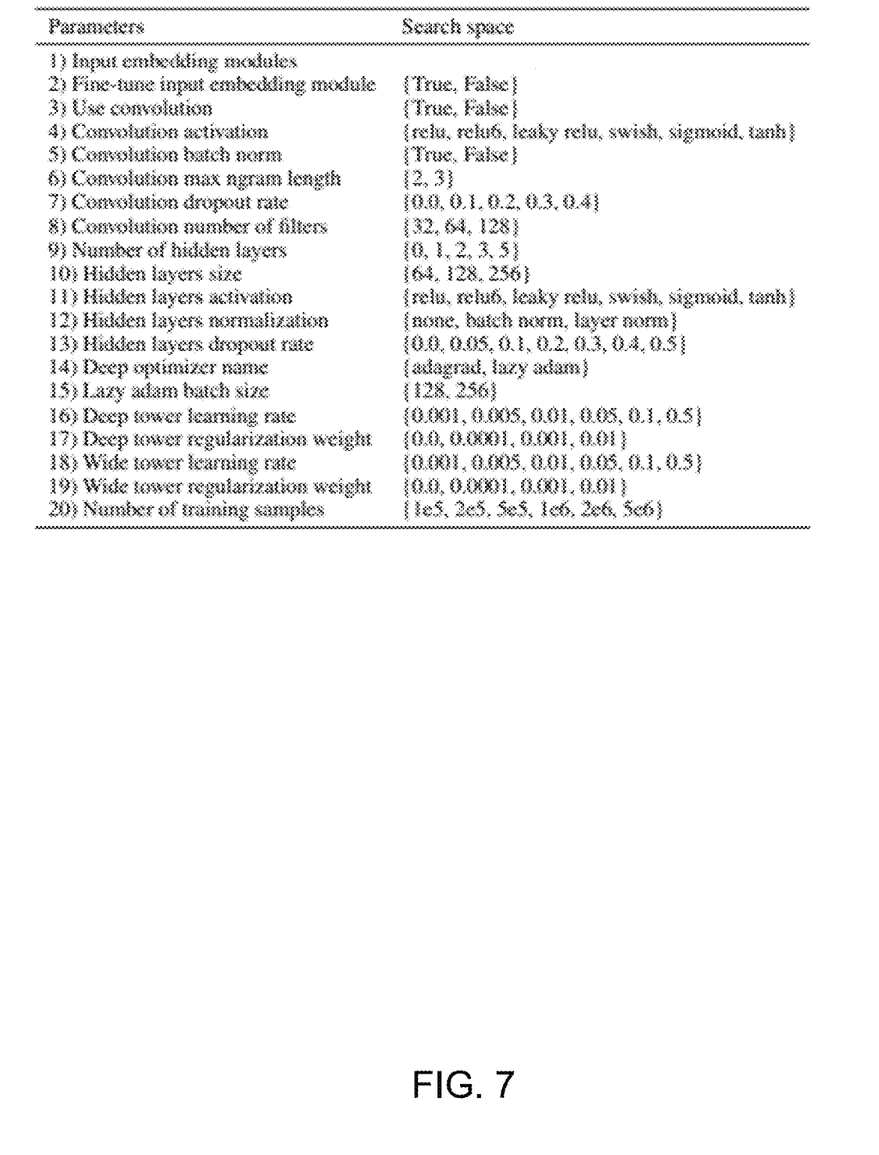
FIG. 7 lists a set of hyperparameters for a text classification task.

FIG. 7 lists a set of hyperparameters for a text classification task. In particular, FIG. 7 shows an example of a search space of two-tower models. One tower is a deep feed forward neural network, built by stacking: a pre-trained text-embedding module, a stack of fully connected layers, and a softmax classification layer. The other tower is a wide-shallow layer that directly connects the one-hot token encodings to the softmax classification layer with a linear projection. The wide tower allows the model to learn task-specific biases for each token directly, such as trigger words, while the deep tower allows it to learn complex patterns. The wide tower is regularized with L1 loss to promote sparsity, and the deep tower is regularized with L2 loss.

The system defines the generated model architecture by selecting a value for every hyperparameter shown in FIG. 7. In particular, the sequence generated by the system includes a respective time step for each of these hyperparameters and by generating the sequence the system defines the architecture of the two tower model.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a request to determine an architecture for a task neural network that is configured to perform a particular machine learning task;
   maintaining data specifying a plurality of candidate architectures for the task neural network, each candidate architecture being defined by respective values of a set of hyperparameters;
   repeatedly performing operations comprising:
      selecting one or more candidate architectures in the maintained data to be modified;
      for each selected candidate architecture:
         generating, using a controller neural network having a plurality of controller parameters and in accordance with current values of the controller parameters, a respective score distribution over possible values for each hyperparameter in the set of hyperparameters;
         generating a new candidate architecture from the selected candidate architecture by, for each hyperparameter in the set of hyperparameters, selecting the value for the hyperparameter for the new candidate architecture to be either (i) the value for the hyperparameter for the selected candidate architecture or (ii) a value selected using the score distribution generated by the controller neural network for the hyperparameter; and
         adding data specifying the new candidate architecture to the maintained data; and
      selecting, as the final architecture for the task neural network, one of the candidate architectures specified in the maintained data.

2. The method of claim 1, wherein selecting one or more candidate architectures in the maintained data to be modified comprises:
   identifying a plurality of candidate architectures from the candidate architectures specified in the maintained data;
   for each identified architecture, determining a measure of fitness of a trained neural network having the candidate architecture; and
   selecting, as a candidate architecture to be modified, the identified architecture having a best fitness.

3. The method of claim 2, the repeatedly performed operations further comprising:
   determining a measure of fitness of a trained neural network having the new candidate architecture; and
   associating the measure of fitness with the new candidate architecture in the maintained data.

4. The method of claim 3, wherein determining a measure of fitness of a trained neural network having the candidate architecture comprises accessing the measure of fitness from the maintained data.

5. The method of claim 3, wherein determining a measure of fitness of a trained neural network having the new candidate architecture comprises:
   instantiating a new neural network having the new architecture;
   training the new neural network on a training subset of training data for the machine learning task to determine trained values of parameters of the new neural network; and
   determining the measure of fitness by evaluating a performance of the trained new neural network on a validation subset of the training data.

6. The method of claim 3, the repeatedly performed operations further comprising:
   determining a reward for the controller neural network from (i) the measure of fitness for the new candidate architecture and (ii) the scores assigned to the values of the hyperparameters that define the new candidate architecture by the controller neural network; and
   determining an update to the current values of the controller parameters based on the reward using a reinforcement learning technique.

7. The method of claim 6, wherein the reinforcement learning technique is a REINFORCE technique.

8. The method of claim 3, the repeatedly performed operations further comprising:
   identifying the N candidate new architectures in the maintained data that have the best measures of fitness; and
   training the controller neural network to maximize the log likelihood for the hyperparameter values that define the N candidate neural network architectures to update the current values of the controller parameters.

9. The method of claim 1, wherein selecting, as the final architecture for the task neural network, one of the candidate architectures specified in the maintained data comprises:
after repeatedly performing the operations, selecting the candidate architecture specified in the maintained data that is associated with the best measure of fitness.

10. The method of claim 1, the repeatedly performed operations further comprising:
removing from the maintained data the data specifying the oldest candidate architecture.

11. The method of claim 1, wherein the controller neural network is configured to process for a plurality of time steps, each time step corresponding to a respective hyperparameter, and wherein, at each time step, the controller neural network is configured to:
receive a controller input for the time step and process the controller input to generate a score distribution over possible values for the hyperparameter corresponding to the time step conditioned on hyperparameter values that were selected for the new candidate architecture for hyperparameters corresponding to previous time steps.

12. The method of claim 11, wherein generating, using a controller neural network having a plurality of controller parameters and in accordance with current values of the controller parameters, a respective score distribution over possible values for each hyperparameter in the set of hyperparameters comprises, at each particular time step of the plurality of time steps:
providing as at least part of the controller input for the particular time step the value that was selected for the hyperparameter corresponding to the time step immediately preceding the particular time step.

13. The method of claim 1, wherein the controller neural network is a recurrent neural network.

14. The method of claim 1, wherein selecting the value for the hyperparameter for the new candidate architecture from among (i) the value for the hyperparameter for the selected candidate architecture and (ii) a value selected using the score distribution generated by the controller neural network for the hyperparameter comprises:
selecting the value for the hyperparameter for the selected candidate architecture with probability p and selecting the value selected using the score distribution generated by the controller neural network for the hyperparameter with probability 1−p, wherein p is a specified value between zero and one.

15. The method of claim 1, wherein the value selected using the score distribution generated by the controller neural network for the hyperparameter is a value sampled from the score distribution.

16. The method of claim 1, further comprising:
using the neural network having the selected architecture to process new inputs.

17. A system comprising one or more computers and one or more storage devices storing instructions that when executed by the one or more computers cause the one or more computers to perform operations comprising:
receiving a request to determine an architecture for a task neural network that is configured to perform a particular machine learning task;
maintaining data specifying a plurality of candidate architectures for the task neural network, each candidate architecture being defined by respective values of a set of hyperparameters;
repeatedly performing operations comprising:
selecting one or more candidate architectures in the maintained data to be modified;
for each selected candidate architecture:
generating, using a controller neural network having a plurality of controller parameters and in accordance with current values of the controller parameters, a respective score distribution over possible values for each hyperparameter in the set of hyperparameters;
generating a new candidate architecture from the selected candidate architecture by, for each hyperparameter in the set of hyperparameters, selecting the value for the hyperparameter for the new candidate architecture to be either (i) the value for the hyperparameter for the selected candidate architecture or (ii) a value selected using the score distribution generated by the controller neural network for the hyperparameter; and
adding data specifying the new candidate architecture to the maintained data; and
selecting, as the final architecture for the task neural network, one of the candidate architectures specified in the maintained data.

18. The system of claim 17, wherein the controller neural network is configured to process for a plurality of time steps, each time step corresponding to a respective hyperparameter, and wherein, at each time step, the controller neural network is configured to:
receive a controller input for the time step and process the controller input to generate a score distribution over possible values for the hyperparameter corresponding to the time step conditioned on hyperparameter values that were selected for the new candidate architecture for hyperparameters corresponding to previous time steps.

19. The system of claim 17, wherein selecting the value for the hyperparameter for the new candidate architecture from among (i) the value for the hyperparameter for the selected candidate architecture and (ii) a value selected using the score distribution generated by the controller neural network for the hyperparameter comprises:
selecting the value for the hyperparameter for the selected candidate architecture with probability p and selecting the value selected using the score distribution generated by the controller neural network for the hyperparameter with probability 1−p, wherein p is a specified value between zero and one.

20. One or more non-transitory computer-readable storage media storing instructions that when executed by one or more computers cause the one or more computers to perform operations comprising:
receiving a request to determine an architecture for a task neural network that is configured to perform a particular machine learning task;
maintaining data specifying a plurality of candidate architectures for the task neural network, each candidate architecture being defined by respective values of a set of hyperparameters;
repeatedly performing operations comprising:
selecting one or more candidate architectures in the maintained data to be modified;
for each selected candidate architecture:
generating, using a controller neural network having a plurality of controller parameters and in accordance with current values of the controller parameters, a respective score distribution over possible values for each hyperparameter in the set of hyperparameters;

generating a new candidate architecture from the selected candidate architecture by, for each hyperparameter in the set of hyperparameters, selecting the value for the hyperparameter for the new candidate architecture to be either (i) the value for the hyperparameter for the selected candidate architecture or (ii) a value selected using the score distribution generated by the controller neural network for the hyperparameter; and adding data specifying the new candidate architecture to the maintained data; and selecting, as the final architecture for the task neural network, one of the candidate architectures specified in the maintained data.

* * * * *